United States Patent [19]
Young

[11] Patent Number: 5,134,550
[45] Date of Patent: Jul. 28, 1992

[54] INDIRECT LIGHTING FIXTURE

[76] Inventor: Richard A. Young, Rte. 2, Box 9-B, Leighton, Ala. 35646

[21] Appl. No.: 723,310

[22] Filed: Jun. 28, 1991

[51] Int. Cl.$^5$ ................................................ F21S 1/10
[52] U.S. Cl. ..................................... 362/32; 362/298; 362/431; 362/812; 40/541
[58] Field of Search ............... 362/298, 299, 300, 296, 362/282, 431, 32, 227, 812; 40/541, 563, 564

[56] References Cited

U.S. PATENT DOCUMENTS

| | | | |
|---|---|---|---|
| 1,476,149 | 12/1923 | Cohen | 362/282 |
| 1,751,011 | 3/1930 | Martin, Jr. | 362/282 |
| 2,082,687 | 6/1937 | Davis | 362/298 |
| 2,106,995 | 2/1938 | Clary | 362/298 |
| 2,125,635 | 8/1938 | Hobart | 362/298 |
| 4,272,802 | 6/1981 | Steadman | 362/431 |
| 4,337,506 | 6/1982 | Terada | 362/298 |
| 4,388,678 | 6/1983 | Turner | 362/296 |
| 4,517,631 | 5/1985 | Mullins | 362/298 |
| 4,933,822 | 6/1990 | NakaMats | 362/282 |

Primary Examiner—Richard R. Cole
Attorney, Agent, or Firm—C. A. Phillips

[57] ABSTRACT

An area lighting fixture is constructed having a tubular pole member having a reflective interior surface and a light source mounted inside the pole and at a lower end thereof. A reflective, concave member is positioned below the light source and generally collimates light from the light source upward through the pole. An access opening covered by an access panel permits convenient access to the light source in the instance where the source fails. At the upper end of the pole, a light dispersing cap having a generally convex reflector receives the light from the source and disperses it around the pole.

8 Claims, 3 Drawing Sheets

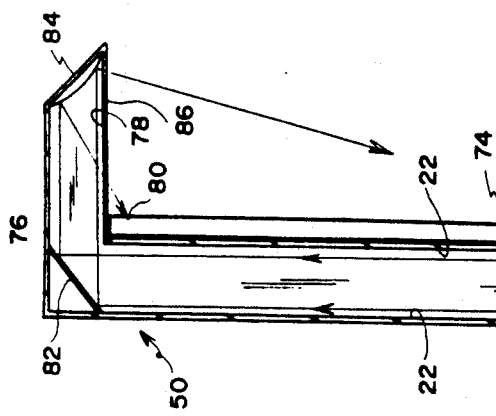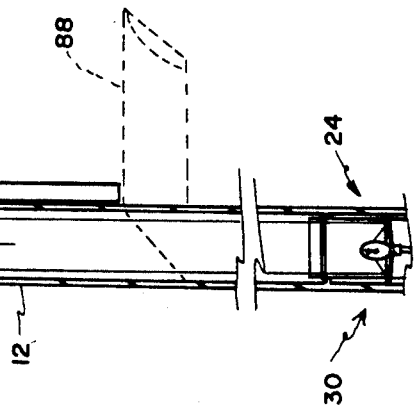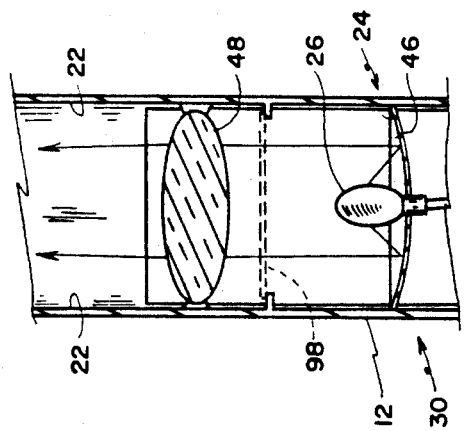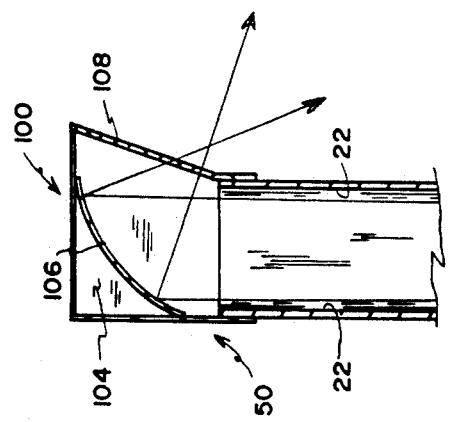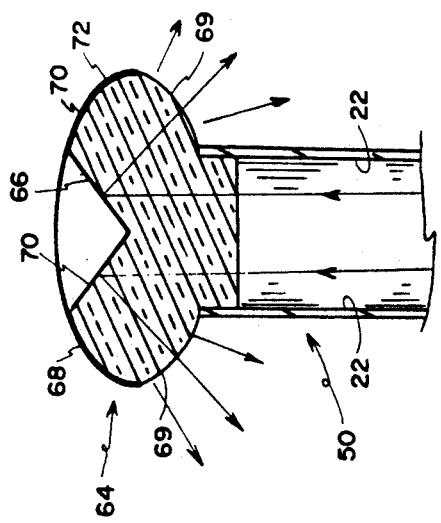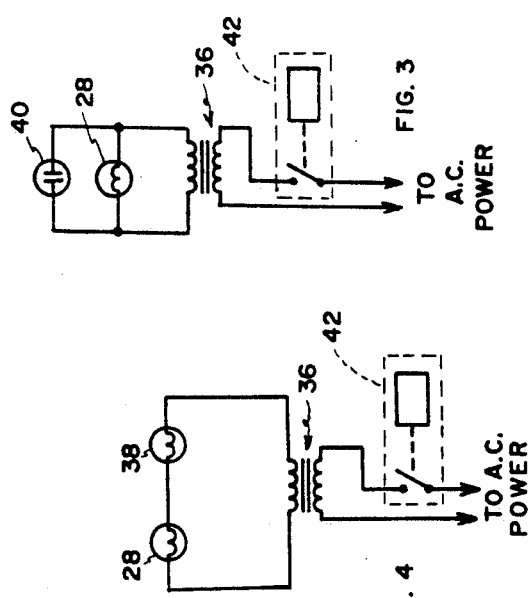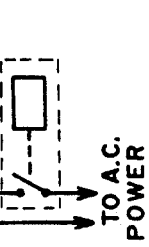

INDIRECT LIGHTING FIXTURE

FIELD OF THE INVENTION

This invention relates to fixtures for providing indirect lighting and particularly to such a fixture wherein a light source is positioned generally at one end of a tubular member having reflective interior surfaces, with a light directing reflective surface positioned at an opposite end of the member for directing light from the member to a selected area.

BACKGROUND OF THE INVENTION

In the past, with respect to area lighting, such as illumination of parking lots and roads, billboard signs spotlighting of particular areas such as a yard in a residential area, and the like, a light source such as a mercury vapor or low pressure sodium bulb driven by a ballast or voltage step-up transformer and mounted in a fixture attached to a tall pole is the preferred way to achieve such illumination. However, this mounting arrangement creates problems, the most obvious of which is the instance wherein the light source fails. In a parking lot illumination fixture or a fixture attached to a utility pole, the poles are generally on the order of 40 feet or more, requiring a truck having a bucket lift in order to lift a person to the fixture and replace the bulb or to effect repairs on the fixture. Typically, the cost of this service, merely to replace a bulb in a parking lot fixture, is about $150.00 per bulb, with repairs to the fixture being much more expensive. With lighting fixtures for illuminating billboard or backlit type signs, it is necessary for a person to be lifted, as by a bucket lift, or climb a ladder or a pole in order to reach the sign. In the instance where the sign is a backlit type, panels of the sign must be disassembled prior to replacing the bulbs and/or ballast. In a residential application, where a homeowner illuminates a yard area by a lighting fixture attached to a pole, when the light bulb fails, the resident must either hire a bucket lift truck or risk life and limb by the questionable technique of propping a ladder against a pole or climb the pole to change the bulb. Even in the application where lighting fixtures are mounted under eaves of a house, when a bulb fails, the resident must climb a ladder or otherwise stand on something in order to gain access to the fixture.

In addition to the obvious problem of maintenance, the lighting fixtures themselves are sometimes heavy contrivances having a ballast mounted internally and requiring sturdy poles in order to support the fixtures. In other instances, the fixtures are mounted in a cantilevered manner, again requiring sturdy poles which may require bracing, as by guy wires. Further, during installation, wiring must be run the length of the pole and secured, adding to the cost of the fixture and installation.

In general, the approach of mounting a lighting fixture and bulb at the top of a tall pole or on the side of a building, while heretofore necessary to disperse light from above, creates expensive maintenance problems, poses hazards to those attending to such problems, and requires poles constructed so as to support the fixture.

Accordingly, it is the object of this invention to provide an area lighting fixture having the light source mounted generally at ground level, providing convenient accessability to both the bulb, bulb fixture, and when used, the ballast.

SUMMARY OF THE INVENTION

A light fixture is constructed having a tubular support pole and a light source mounted inside the pole at a lower end thereof. A reflector is positioned below the light source and reflects light from the light source upwardly through the pole. At the upper end of the pole, a reflective cap disperses light over an area to be illuminated.

BRIEF DESCRIPTION OF THE DRAWINGS

FIGS. 3 and 4 are schematic illustrations of electrical connections of the present invention.

FIG. 5 is a cut-away view of an alternate embodiment of the present invention.

FIG. 7 is a cut-away view of an alternate embodiment of a cap of the present invention.

FIG. 8 is a cut-away view of an alternate embodiment of the present invention for illuminating a sign.

FIG. 11 is a cut-away view of yet another alternate embodiment of the present invention.

DETAILED DESCRIPTION OF THE DRAWINGS

Figure 1:
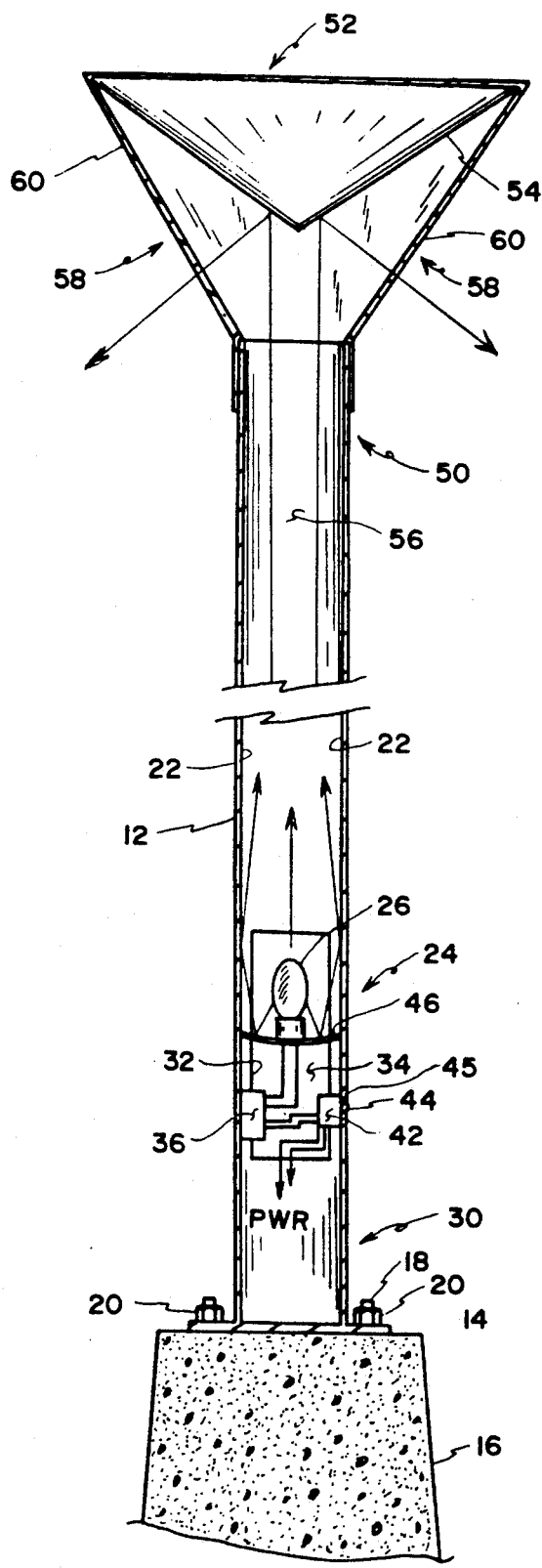
FIG. 1 is a cut-away view of an area lighting fixture of the present invention.
Figure 2:
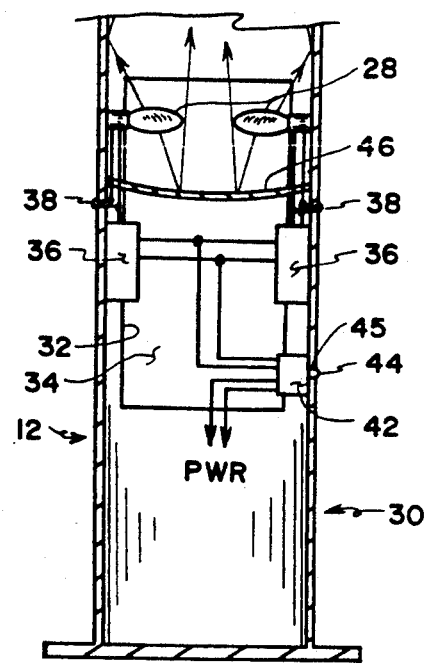
FIG. 2 is a cut-away view of a lower end of one embodiment of the present invention showing particulars of construction thereof.

Referring initially to FIG. 1, an area lighting fixture 10 is shown which would generally be used to illuminate a parking lot or other application requiring widely dispersed lighting. Here, a tubular pole 12 having a flanged base 14 is vertically mounted to a concrete footing 16 in a conventional manner, such as openings in flange 14 that match with studs 18, and being secured in place with bolts 20. Pole 12 extends upward a distance commensurate with the area it is desired to illuminate and is provided with a highly reflective interior surface 22, preferably in the form of a highly polished stainless steel liner or a highly reflective coating. This liner or coating directs incident and reflected light upward from a light source 24. Light source 24 may be in the form of a single light bulb 26 (FIG. 1) or a plurality (FIG. 2) of light bulbs 28 of the mercury vapor, low pressure sodium, halogen, incandescent or fluorescent types, or any other source of illumination commonly used for area lighting and are mounted in the interior of pole 12 at or near base 30 thereof. Where a plurality of bulbs 28 are used for redundancy, which in the case of halogen, mercury vapor, low pressure sodium, or incandescent type bulbs, the bulbs may be of about 100 watts each, and may be mounted shown in FIG. 2 extending inward horizontally from interior sides of pole 12. Where a single bulb 26 is used, as shown in FIG. 1, the bulb is of about 250 watts or more and may be mounted in a centralized position along an axis of pole 12. Further, in the instance where one or more fluorescent tubes (not shown) of about 40 watts or more each are used, the tubes may be vertically positioned inside pole 12, with an inwardly sloped reflector or reflectors disposed to reflect light from sides of tubes generally upward.

These mounting arrangements of the light source at base 30 of pole 12 allows convenient access to the light source and fixtures for replacement or repair, as by an access opening 32 located proximate the bulb or bulbs, which access opening is covered by a door or panel 34 (FIGS. 1 and 2), which also may be provided with an interior reflective surface.

As some of the aforementioned types of bulbs require a ballast or step-up transformer 36 to power the bulb, conventional mounting provisions are made to mount the ballast inside pole 12 proximate opening 32. Alternately, the ballast may be mounted outside pole 12 in an enclosure (not shown) conventionally mounted as by conventional fasteners. In the instance wherein a plurality of bulbs or tubes are used, a small indicator light 38, 40 (FIGS. 2, 3, and 4) for each of the illuminating bulbs and of the incandescent or ionized gas type, is used to visually indicate a failed condition of the respective bulb. The indicator bulbs are electrically coupled in parallel (FIG. 3), series (FIG. 4), or inductively coupled (not shown) with the illuminating bulb. Additionally, a conventional control circuit 42 incorporating a photocell 44 mounted in an opening 45 of pole 12 may be utilized to effect automatic night-on day-off operation of light source 24.

For reflecting downwardly radiated light from light source 24 upward through pole 12 in a generally collimated manner, a slightly concave, or alternately, a flat reflector 46, which may be made of highly polished stainless steel, a chromed material, or material provided with a reflective coating, such as a glass or ceramic mirror, is positioned below the light source and reflects and focuses the downwardly radiated light from source 24 upward through pole 12. Additionally, a collimating lens 48 (FIG. 5) may be positioned above the light source to further collimate light toward the upper end 50 of pole 12. Thus, light from light source 24 is reflected upward by the reflective interior sides of pole 12 and is collimated by a reflector and/or lens positioned below and above, respectively, the light source.

Figure 6:
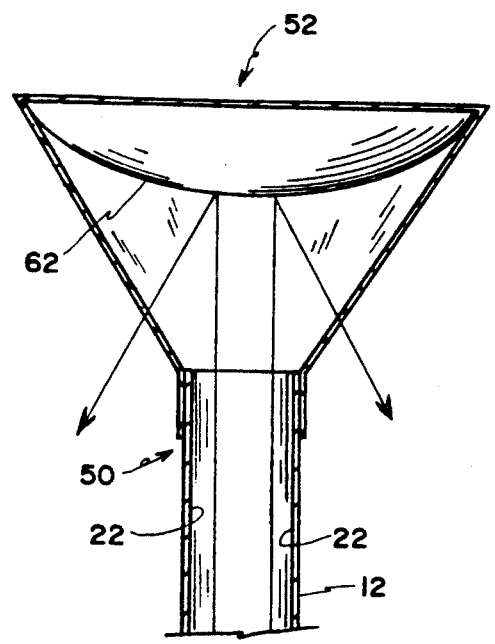
FIG. 6 is a cut-away view of another embodiment of the present invention.

For dispersing light from the light source outside pole 12, a cap 52 (FIG. 1) having a conical or convex (FIG. 6) reflector 54 mounted by conventional means not shown and constructed of highly polished reflective material, such as stainless steel, or a coated material, is mounted to upper end 50 of pole 12. Cap 52 generally closes the open upper end of pole 12, protecting interior 56 from the elements and is further provided with light passing regions 58 on an underneath portion thereof in order to pass light from reflector 54.

Transparent or translucent panels 60 may be incorporated in the light passing regions of cap 52 where it is desired to protect reflector 54 and prevent dust or other contaminants from entering pole 12, or the light passing regions of cap 52 may be left generally open to eliminate maintenance of panels 60. Alternately, FIG. 7 illustrates a solid cap 64 of light transmissive material, such as a transparent plastic, mounted to the upper end 50 of pole 12, and which may be provided with a conical or concave (not shown) depression 66 in an upper side 68 thereof in order to distribute light outward.

Light passing regions 69 in this embodiment are preferentially provided with a slight convex curvature but may be flat or concave. Upper side 68 and depression 66 may be coated with a reflective coating 70, such as chrome or silver, as is common in the construction of mirrors, with an upper coating 72 of a protective material, such as an epoxy resin, over the reflective coating for protection thereof. While caps 52 and 64 as shown, are constructed to radiate light over a generally circular or annular area, the caps may be constructed in any shape to project light over a selected area. Notably, with the heavy ballast and bulb support apparatus being mounted in the base of pole 12, and the cap and reflectors therein constructed of lightweight materials, pole 12 may also be constructed of lighter and less expensive materials than area lighting fixtures of the past.

For illuminating a generally vertical surface, such as a billboard sign 74, FIG. 8 illustrates an application of the invention as described above wherein a tubular cap 76, which also may be provided with reflective interior surfaces 78 as described, is configured to extend horizontally a short distance beyond an upper side 80 of the surface to be illuminated. Cap 76 is provided with a reflector 82 angled to reflect light from the light source to a second reflector 84 contoured and positioned to disperse reflected light from reflector 82 downward through opening or transparent panel 86 to illuminate sign 74. Reflectors 82 and 84 may be configured to focus and disperse the light as necessary, as by providing reflector 82 with a slight concave curvature for focusing light to reflector 84, and providing reflector 84 with a slight convex cylindrical curvature for dispersing light from reflector 84 over a selected, wide area of sign 74. Additionally, a cap 88 (dashed lines) may extend from a lower side of sign 74 to illuminate sign 74 from below, preventing motorists or pedestrians in the immediate proximity of the sign from being temporarily blinded. Alternately, the tubular caps may be provided with reflective interior surfaces and be curved in order to direct light to the sign.

Figure 10:
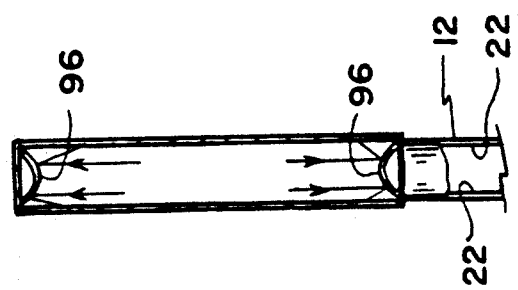
FIG. 10 is a cut-away view taken along lines 10—10 of FIG. 9.
Figure 9:
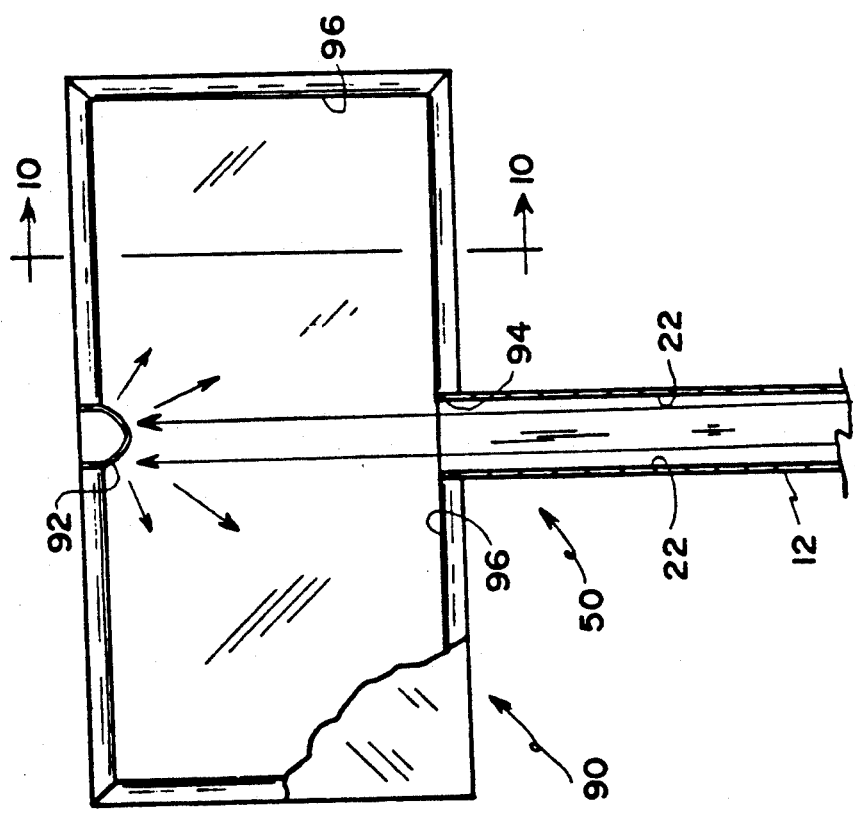
FIG. 9 is a cut-away view of an alternate embodiment of the present invention for illuminating a backlit sign.

In the instance of a backlit sign 90 (FIG. 9), a generally convex reflector 92 positioned inside the sign and above opening 94 of pole 12 is configured to disperse light throughout the interior of sign 90, with cylindrical, generally convex interior side reflectors 96 configured as shown in FIG. 10, serving to further distribute light from reflector 92 within sign 90. Still further yet, in the billboard and backlit signs described above, a removable, transparent, tinted plate 98 (FIG. 5) may be positioned above the light source in order to change color of the light, enhancing or highlighting advertising media thereon. Here, ventilation openings may be provided in plate 98 or pole 12 in order to prevent heat from building to damaging levels. Further, for the billboard-type sign, the removable lens described above and light dispersing member may be configured to focus light passed through a plate 98 (FIG. 5) having advertising media impressed thereon, with the vertical surface of sign 74 configured as a screen for receiving the light and media on plate 98.

Yet another application of the present invention is shown in FIG. 11. In this instance, the light application is confined to a particular area, such as a yard of a residence. In this embodiment, cap 100 is constructed having opaque rear and side portions 102 and 104 and a concave inner reflector 106 generally configured and positioned as shown to disperse light through a transparent front panel 108 to a selected area.

From the foregoing, it is apparent that the applicant has provided an area lighting fixture that allows convenient access to the light source, which is located generally at a ground level and does not locate components that require servicing at an elevated height above the ground. Additionally, since the relatively heavy ballast and support structure for the bulb is mounted at the lower end of a pole, the pole itself may be constructed to support a relatively light protective cap and reflector.

What is claimed is:

1. A lighting fixture for illuminating an area comprising:
    a tubular pole member having lower and upper ends and an interior reflective surface;
    a light source in said pole member generally near said lower end;
    an access panel covering an opening in said pole member proximate said light source for providing access thereto;
    a concave reflector in said lower end below said light source and disposed for reflecting and focusing light from said light source to said upper end; and
    a generally convex reflector mounted to an upper end of said pole member for reflecting light from said illumination bulb outwardly and downwardly.

2. A lighting fixture as set forth in claim 1 comprising a tinted plate positioned between said light source and said convex reflector for altering color of light from said light source.

3. A lighting fixture as set forth in claim 1 wherein a ballast for said light source is mounted inside said pole member.

4. A lighting fixture as set forth in claim 1 wherein said generally convex reflector is located in an upper region or a backlit sign and spaced apart from an upper end of said tubular pole member, with reflective surfaces positioned along inside edges of said backlit sign disposed for dispersing light from said generally convex reflector to rear portions of said backlit sign.

5. A lighting fixture for illuminating an area comprising:
    a tubular pole member having upper and lower ends;
    a light source mounted on an interior side of said pole member generally near said lower end thereof;
    a reflector in said lower end and positioned below said light source and disposed for reflecting light from said light source to said upper end of said pole member; and
    a light dispersing member mounted to said upper end of said pole member and constructed of a solid, light transmissive material having upper reflective surfaces therein for receiving and dispersing said light from said light source over said area.

6. A lighting fixture for illuminating an area comprising:
    a tubular pole member having lower and upper ends;
    a light source mounted on an interior side of said pole member generally near said lower end thereof;
    a reflector in said lower end and positioned below said light source and disposed for reflecting light from said light source to said upper end of said pole member;
    a light dispersing member mounted to said upper end of said pole member, for receiving and dispersing said light from said light source over said area;
    a removable, transparent tinted plate mounted above said light source, for altering color of said light dispersed over said area; and
    a lens mounted over said tinted plate, for focusing said light from said light source onto said light dispersing member.

7. A lighting fixture as set forth in claim 6 wherein said light dispersing member is disposed for illuminating a vertical surface and extends beyond at least one side of said vertical surface and is configured having interior surfaces for reflecting light from said pole member onto said vertical surface.

8. A lighting fixture for illuminating an area comprising:
    a tubular pole member having lower and upper ends;
    a plurality of illumination bulbs mounted on an interior side of said pole member generally near said lower end thereof;
    a smaller, pilot light for each said illumination bulb of said light source and electrically coupled to each said respective illumination bulb, for indicating a failed condition of each said illumination bulb;
    a reflector in said lower end and positioned below said illumination bulbs and disposed for reflecting light from said bulbs to said upper end of said pole member; and
    a light dispersing member mounted to said upper end of said pole member, for receiving and dispersing said light from said bulbs over said area.

* * * * *